United States Patent [19]
Hayman et al.

[11] Patent Number: 5,321,805
[45] Date of Patent: Jun. 14, 1994

[54] RASTER GRAPHICS ENGINE FOR PRODUCING GRAPHICS ON A DISPLAY

[75] Inventors: Mark C. Hayman, Laurel; Ralph E. Roland, Hanover, both of Md.

[73] Assignee: Westinghouse Electric Corp., Pittsburgh, Pa.

[21] Appl. No.: 660,301

[22] Filed: Feb. 25, 1991

[51] Int. Cl.⁵ .............................................. G06F 15/20
[52] U.S. Cl. ...................................... 395/162; 395/164
[58] Field of Search .................................. 395/162–166, 395/157, 158; 340/747, 721, 701, 798–799; 345/133, 185, 186, 188, 203

[56] References Cited

U.S. PATENT DOCUMENTS

| | | | |
|---|---|---|---|
| 4,366,476 | 12/1982 | Hickin | 340/747 |
| 4,648,045 | 3/1987 | Demetrescu | 395/163 |
| 4,791,580 | 12/1988 | Sherrill et al. | 395/164 |

*Primary Examiner*—Dale M. Shaw
*Assistant Examiner*—Kee M. Tung
*Attorney, Agent, or Firm*—Eugene LeDonne

[57] ABSTRACT

A graphics engine receives commands or items in high-level graphics, translates these items to primitive codes representing primitive graphics, converts the primitive codes to individual pixel codes and addresses associated therewith and stores the pixel codes in an image memory according to priority in the pixel code. When a new pixel code is received for storing, the stored pixel code in the storage location associated with the new pixel code is read. The stored priority of the stored pixel code is compared with a display priority of the new pixel code and the pixel code having the higher priority is selected for storing at the storage location. The pixel codes are read from the image memory and in a conventional manner are converted using a video look-up table to produce output to a display device. The conversion from primitive graphics to pixel codes includes the process of converting symbol codes into an array of pixels using a symbol font memory. Memory cycles used in accessing the image memory are varied to reduce the time required for movement of graphics.

20 Claims, 7 Drawing Sheets

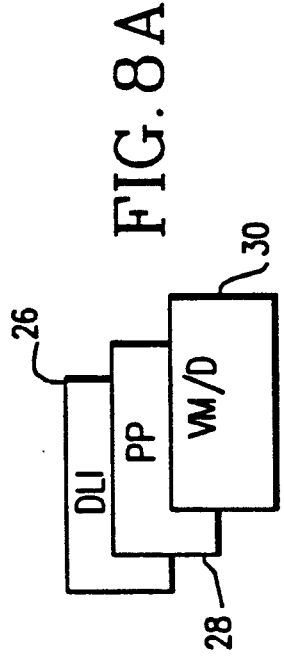
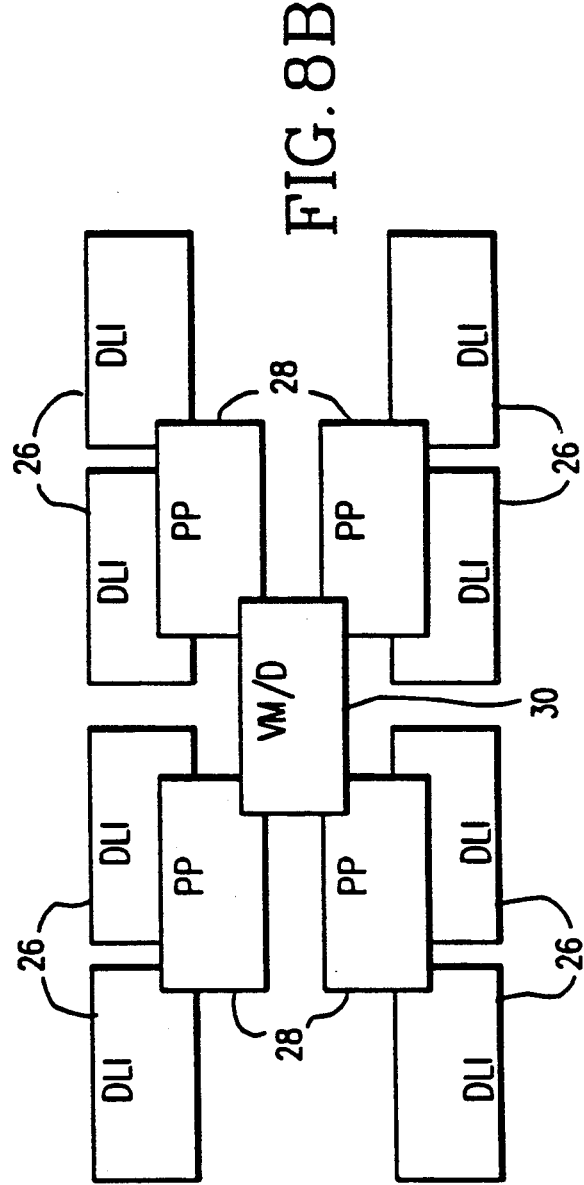

RASTER GRAPHICS ENGINE FOR PRODUCING GRAPHICS ON A DISPLAY

BACKGROUND OF THE INVENTION

1. Field of the Invention

The present invention is directed to the conversion of high-level graphics into pixel codes for display on a display device and, more particularly, to a raster graphics engine with speed and flexibility for use in radar applications.

2. Description of the Related Art

The term "graphics engine" is used to describe a data processing device which takes high-level graphics, such as text characters, symbols of various sizes, such as rectangles, circles and triangles, line segments and arcs, etc., and outputs signals which can be used in driving a display device such as a cathode ray tube (CRT) in a computer monitor. There are many types of devices which can be used as a graphics engine. The more powerful personal computers include simple graphics engines which are typically so slow that they cannot be used for real-time display of data. Slightly more powerful are work stations, such as those manufactured by SUN or APOLLO, which come closer to real-time operation, but typically exhibit annoyingly slow response in performing certain functions, such as zoom or pan. Due to the lack of speed and even slower speeds which were available in years past, applications demanding faster response, such as air traffic control radar or weapons control radar, typically use hardware specifically designed for each application. While it was possible to obtain reasonably quick responses using such unique hardware designs, when the functions to be performed by such applications are expanded, it is necessary to redesign significant portions of the hardware.

Furthermore, there are several different basic types of high-level graphics. Fixed size symbols, i.e., text, is easily converted into display data when no other type of graphics is to be displayed. However, high-level graphics may also define vectors or solid polygons of various sizes, shapes and shading. When one of these other types of high-level graphics are mixed with symbols, it often becomes much more difficult to generate the fixed size symbols. Also, some applications display more than one set of video data. For example, radar applications typically combine a display of target tracks with identifying textual information. The sweep of the radar and textual information are superimposed on a single screen. None of the existing systems provide both flexibility and high speed response.

SUMMARY OF THE INVENTION

An object of the present invention is to provide a graphics engine capable of handling both symbols and vectors efficiently.

Another object of the present invention is to efficiently prioritize overlapping graphics items.

A further object of the present invention is to provide a graphics engine capable of changing a displayed image in 200 milliseconds or less to appear "instantaneous" to an operator.

Yet another object of the present invention is to provide a graphics engine capable of being modified to handle different high-level graphics data formats.

A further object of the present invention is to provide a graphics engine capable of merging computer generated video images with radar scan-converted video and other video sources.

These objects are attained by providing a system for displaying graphics on a display device, comprising: a display list interpreter to receive high-level codes representing high-level graphics and to translate the high-level codes into primitive codes representing primitive graphics; a pixel processor, operatively connected to the display list interpreter and including a video memory, to determine pixel characteristics of all pixels, defined by each of the primitive graphics, by processing the primitive codes sequentially to produce a pixel address, pixel control data and pixel codes defining pixel appearance and display priority, for each of the pixels defined by each of the primitive codes, to store the pixel codes in the video memory for output towards the display device and to update the video memory when the display priority of one of the pixel codes is higher than a stored priority of a stored pixel code addressed by the pixel address, for each of the pixel codes; and a video mixer/driver operatively connected to the pixel processor, to mix the pixel codes from the pixel processor and at least one additional video source.

Preferably, the display list interpreter uses a microprocessor programmed to translate the high-level codes into the primitive codes, so that the methods used by the display list interpreter can be easily changed to accommodate different high-level data formats. The pixel processor preferably has a pipelined architecture with a first stage for receiving data, a second stage for making line number and initial column number calculations with reference to a symbol font memory for text characters, a third stage for completing location of the pixels and a fourth stage for comparing the display priority of each new pixel code with the stored priority of the pixel previously stored at the same storage location.

Processing speed of the graphics engine is increased by taking advantage of reduced memory cycles for specific operations. For example, when the row address of two consecutive pixels is the same, the memory cycle time can be reduced since only the column address has to change. Also, use of a memory unit larger than needed to display all of pixels on the display device permits using non-displayed portions of the memory to temporarily hold pixel codes. For example, when a cursor or a radar scan line is moved around the screen, the pixel codes which are obliterated by the temporarily positioned object can be copied to a non-displayed portion of the memory while the temporarily displayed object is displayed and then copied back when the temporarily displayed object is moved elsewhere. Similarly, copy modes can be used to copy from one displayed portion of the memory to another displayed portion, e.g., when the cursor moves.

These objects, together with other objects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

FIGS. 8A and 8B are block diagrams of minimum and maximum configurations of the preferred embodiment of the present invention.

DESCRIPTION OF THE PREFERRED EMBODIMENT

Figure 1:
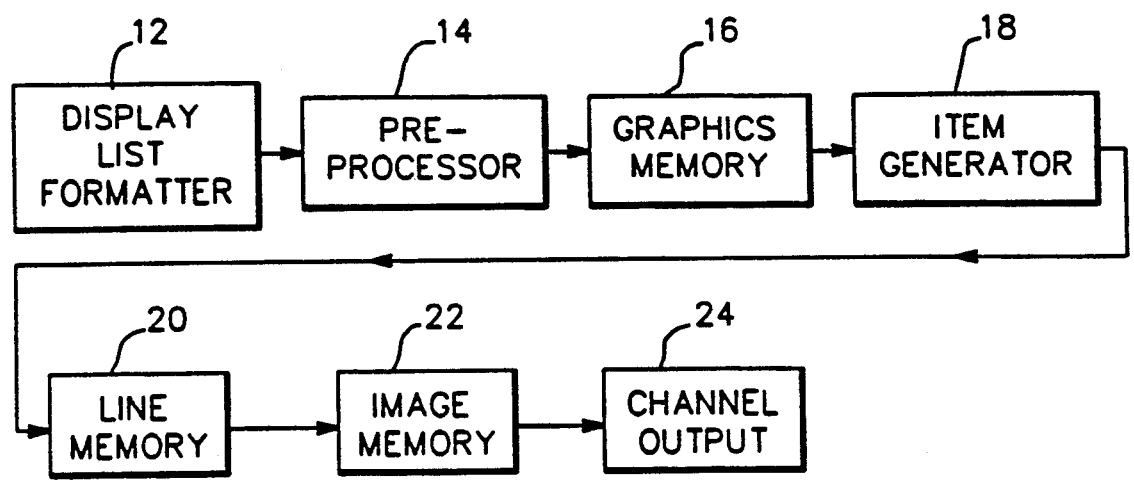
FIG. 1 is a block diagram of a prior art raster graphics engine.

Prior to describing the preferred embodiment, a more detailed description of a raster graphics engine specifically designed for a radar application will be described with reference to FIG. 1. In the prior art device, high-level codes representing high-level graphics are received and stored by a display list formatter 12. The high-level codes are stored in the display list formatter 12 and read out by a preprocessor 14. The preprocessor 14 reads one graphics item at a time and translates the high-level graphics into primitive graphics items. For example a high-level graphics item may define a symbol for type of airplane, a velocity vector and several lines of several characters providing information on that airplane. Each character, the vector and the airplane symbol is a separate primitive graphics item. In the prior art device, the preprocessor 14 includes a bit-slice processor and supporting circuitry which could only produce primitive graphics for a particular type of raster scan format.

The primitive graphics items are stored in a graphics memory 16 in the form of a linked list. The linked lists are stored in accordance with the priority of each item. Digital circuitry is used by the graphics memory 16 to obtain the desired operating speed which was unobtainable using a microprocessor. As a result, the way in which priority of the primitive graphics items was handled was fixed unless the graphics memory 16 was rewired with different components.

The linked lists in the graphics memory 16 are read one line at a time by an item generator 18. The item generator 18 processes the items in the linked lists and prioritizes the items on one line at a time. The lowest priority items were output first to a line memory 20. A separate buffer for each of two rows was provided in the line memory 20, so that one buffer can receive data from the item generator 18 while the second buffer outputs data to an image memory 22. The image memory contains one display screen worth of pixel data, i.e., 1280 pixels on each of 1024 rows. A channel output unit 24 scans through the image memory 22 sixty times per second, accesses a video look-up table to determine the color associated with each pixel, converts the resulting value from digital to analog and outputs analog video signals to a display device, together with synchronization signals to generate the desired video picture onto the display device.

Figure 2:
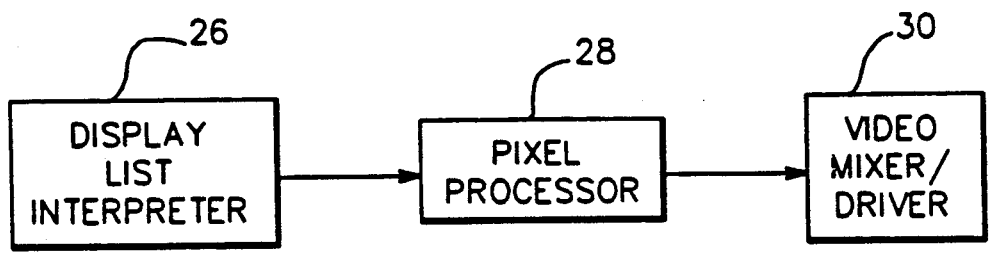
FIG. 2 is a block diagram of a raster graphics engine according to the present invention.

In the preferred embodiment of the present invention, the number of basic units is reduced to three. As illustrated in FIG. 2, a display list interpreter (DLI) 26 receives the same high-level codes received by the display list formatter 12 and produces primitive codes representing primitive graphics in a manner similar to the preprocessor 14 of the prior art device. Unlike the preprocessor 14, the display list interpreter 26 uses a programmed microprocessor to perform the translation from high-level graphics to primitive graphics, thereby enabling different high-level data formats to be used more easily. When a permanent change occurs on the screen, i.e., any change which cannot be predicted to be temporary, like the positioning of a cursor, the DLI 26 outputs all of the primitive codes stored in the VRAM 54. However, while outputting these primitive codes, only the fields which change from one code to the next are output.

The primitive codes are output from the DLI 26 to a pixel processor 28 which performs functions similar to the graphics memory 16, item generator 18, line memory 20 and image memory 22, but in a different manner. The pixel processor 28 preferably has a pipelined architecture which processes the primitive codes as they are output from the display list interpreter 26 and converts the primitive codes to pixel codes which are stored in an image memory (not illustrated in FIG. 2). The pixel codes include display priority. The image memory is updated when a pixel code is received with a display priority higher than the stored priority of a stored pixel code in a storage location to which the new pixel code is addressed. As a result, there is no need for repeated sorting as in the prior art device, but rather each pixel is stored or not stored depending upon its relative priority.

The pixel codes are output from the pixel processor 28 to a video mixer/driver 30 for output to the display device. Unlike the channel output device 24 and as apparent from its name, the video mixer/driver 30 can combine output from several pixel processors 28 or from other video sources. All that is required is that the pixel data received from other video sources include the same priority coding used by the pixel codes output from the pixel processor 28. A video look-up table, digital/analog converters if needed and synchronization circuits are included in the video mixer/driver so that the same display device can be connected to a system according to the present invention as used with the prior art device.

Figure 3:
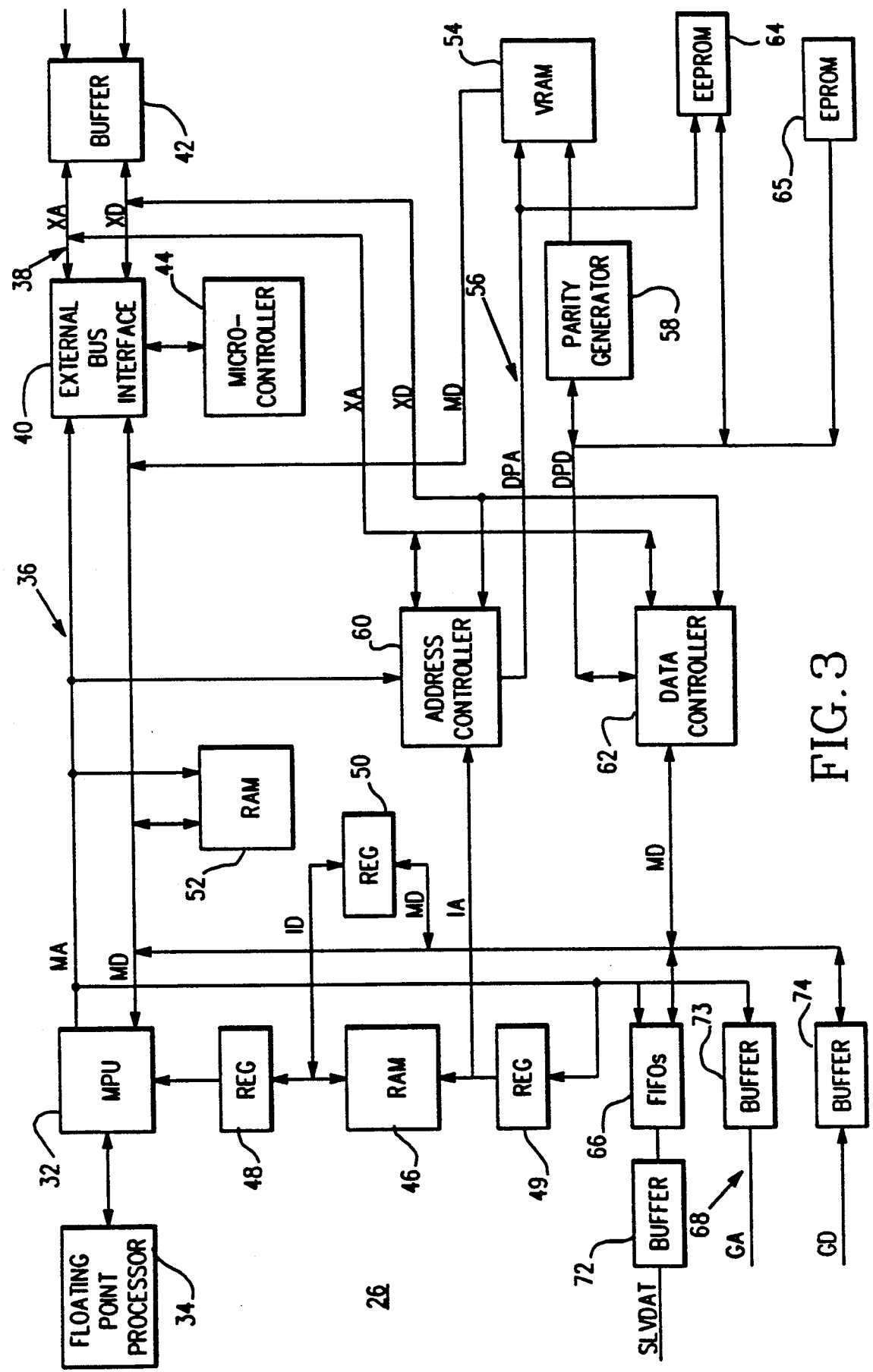
FIG. 3 is a block diagram of a display list interpreter in the preferred embodiment of the present invention.

The construction and operation of the display list interpreter 26, pixel processor 28 and video mixer/driver 30 will now be described in more detail. The preferred embodiment of the display list interpreter 26 is illustrated in FIG. 3. As noted above, a microprocessor (MPU) 32 performs the translation from high-level graphics to primitive graphics. In the preferred embodiment, the MPU 32 is a reduced instruction set computer (RISC), such as an Advanced Micro Devices 29000. The operations performed by the MPU 32 are completed more quickly if a floating point processor 34, such as the Advanced Micro Devices 29027, is included. The MPU 32 is connected to a microprocessor bus 36 which includes an address bus MA and a data bus MD. The microprocessor bus 36 connects the MPU 32 to an external bus 38 via an external bus interface 40. The external bus 38 includes an address bus XA and a data bus XD and supplies the high-level graphics from another computer (not shown), such as a Digital Equipment Corporation VAX minicomputer. The external bus may be a MULTIBUS II or VME bus and one or more buffers 42 may be provided between the other computer and the external bus interface 40. A microcontroller 44, such as an INTEL 8751, controls the operation of the external bus interface 40 to maintain communication between the MPU 32 and the other computer connected to the external bus 38.

Several memories are included in the display list interpreter 26. An instruction memory 46 stores instructions controlling translation of the high-level into the primitive code. Registers 48-50 connect the instruction memory 46 to the MPU 32 and the microprocessor bus 36, so that the instructions can be supplied to the MPU 32 and new instruction can be stored in the instruction memory 46. A scratch pad memory 52 is connected directly to the microprocessor bus 36 for storing values used in calculations performed by the MPU 32. The instruction 46 and scratch pad 52 memories may be 64K words, e.g., 32 bits in the case of Advanced Micro Devices 29000, of static random access memory.

Most importantly a display list memory 54 is provided for storing the high-level codes received from the external bus 38. As illustrated in FIG. 3, in the preferred embodiment, the display list memory 54 is a dual port video random access memory (VRAM). Data is supplied to the VRAM 54 via a display list parallel bus 56, including an address bus DPA and a data bus DPD. Prior to being stored in the VRAM 54, the high-level codes pass through a parity generator 58 which may be an Advanced Micro Devices 29853. The VRAM 54 is also connected directly to the data bus MD of the microprocessor bus 36 via a serial port. One of the reasons a video random access memory is used as the display list memory 54 in the preferred embodiment is that it includes an internal buffer for storing data to be transmitted from the serial port. Data can be quickly dumped into the internal buffer and then new data can be received over the parallel bus 56 while data is transmitted from the serial port to the microprocessor bus 36.

To maintain control over the transmission of data within the display list interpreter 26, an address controller 60 and data controller 62 are provided. The address and data controllers 60, 62 are each preferably a triple port logic cell array. Each have connections to the microprocessor bus 36, external bus 38 and display list parallel bus 56. The address and data controllers 60, 62 enable storage of high-level codes from the external bus 38 into the VRAM 54 without intervention of the MPU 32. In addition, the address and data controllers 60, 62 read out high-level codes from the VRAM 54 to the MPU 32 via the internal buffer and serial port of the VRAM 54.

The address controller 60 also receives addresses from register 49 to access instructions stored in a read only memory 64. As indicated in FIG. 3, the memory 64 is preferably an electrically erasable programmable read only memory (EEPROM). The memory 64 may be used to store instructions for the MPU 32 which are unlikely to change regardless of what high-level data format is used. For example, tables for generating sine and cosine values and other basic graphical conversions may be stored in the memory 64. Another read only memory 65 stores configuration data for the address and data controllers 60, 62.

As noted above, the translation of high-level codes into primitive codes is commonly performed by graphics engines and the requirements for such translation are well known in the art. Thus, one of ordinary skill in the art with the ability to program the MPU 32 can produce the instructions stored in the instruction memory 46. The results of the translation process are stored in a group of first-in first-out buffers (FIFOs) 66. When the display list interpreter 26 receives an indication from the pixel processor 28 over the slave data lines (SLVDAT), the primitive codes are output from the FIFOs 66 to the pixel processor 28 over the SLVDAT line.

A separate graphics bus 68, including an address bus GA and data bus GD, is provided to allow the display list interpreter (DLI) 26 to directly interface with a memory controller 70 in the pixel processor 28, allowing the DLI 26 to request specific addresses of the image memories to be read or written for the DLI 26. These requested memory cycles will be interleaved, by the memory controller 70, with those cycles being requested within the pixel processor 28. Buffers 72-74 may be provided in a conventional manner between the DLI 26 and the pixel processor 28.

Figure 4:
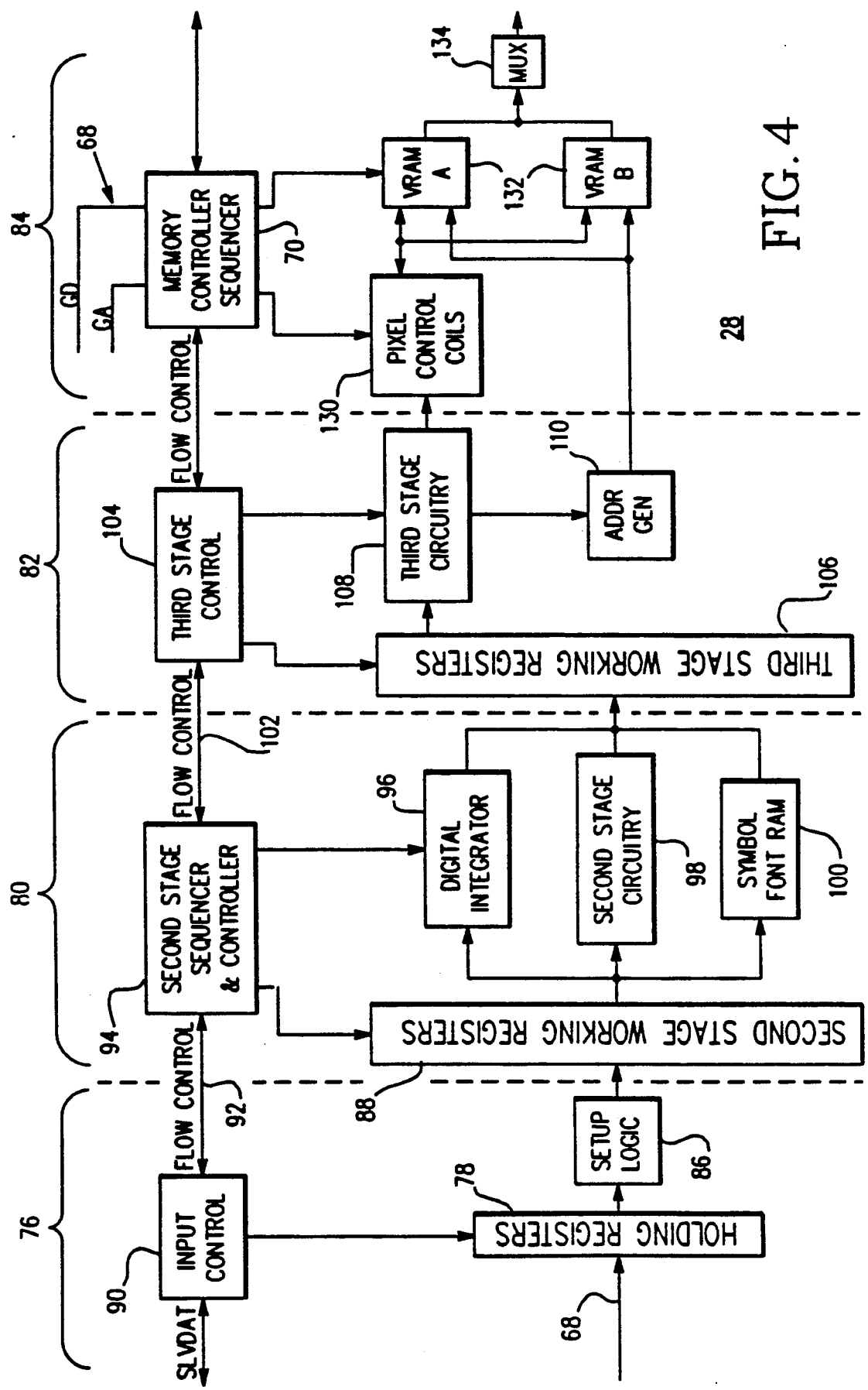
FIG. 4 is a block diagram of a pixel processor in the preferred embodiment of the present invention.

The pipelined architecture of the pixel processor 28 is illustrated in FIG. 4. In the preferred embodiment, the pixel processor 28 has four stages. The first stage 76 receives the primitive codes from the display list interpreter 26 and stores the primitive codes in holding register 78. The second stage 80 processes the primitive codes to determine rows of the display device used by the primitive graphics represented by the primitive codes and to partially calculate the column of the pixels. The third stage 82 completes the determination of the pixel address of each of the pixels defined by each of the primitive codes and outputs the pixel code, pixel address and pixel control data. The fourth stage determines which pixel codes are to be displayed according to the display priority and stores the pixel codes to be displayed in a video memory at the storage location identified by the pixel address associated therewith. Details of each stage will be provided below.

The first stage 76 is primarily a buffer in the pixel processor 28 corresponding to the FIFOs 66 in the display list interpreter 26. The primitive codes pass through setup logic 86 which prepares the primitive codes for processing in the second stage 80 and stores the result in second stage working registers 88. For example, primitive graphics which require only one display line need to be identified and checked to see if they will be clipped.

An input control unit 90 in the first stage 76 outputs signals over a flow control line 92 to a second stage sequencer and controller 94 indicating that the data from the holding registers 78 via the setup logic 86 is ready for processing in the second stage working registers 88. When the holding register values have been stored in the second stage working registers 88 by the second stage controller 94, the input control unit 90 in the first stage 76 outputs a signal on the SLVDAT line which indicates to the FIFOs 66 in the display list interpreter 26 that another group of primitive codes can be transmitted to the holding register 78 in the first stage 76 of the pixel processor 28. In the preferred embodiment, the pixel processor 28 can perform its operations so quickly, that two DLIs 26 can be connected to the SLVDAT line and the graphics bus 68. The input control unit 90 switches between the two DLIs 26 when released by the active DLI 26.

The second stage sequencer and controller 94 controls the operation of a digital integrator 96 and other second stage circuitry 98. The digital integrator 96 operates on the data stored in the second stage working registers 88 to calculate a line number (row address) and starting column number for all of the rows associated with each primitive code. In the case of symbols such as ASCII text, a symbol font random access memory 100 is referenced to determine a pixel pattern for each line of a symbol. The primitive codes in the second stage working registers 88 are processed by the second stage circuitry 98 and digital integrator 96, as described further below.

The second stage sequencer and controller 94 transmits signals over flow control line 102 to a third stage control unit 104 when data is output from the digital integrator 96. Third stage working registers 106 receive the data from the second stage 80 and supply the data to third stage circuitry 108 which completes calculation of the column address, using the information provided by the second stage 80. An address generator 110 outputs the row and column address for the pixel data.

Figure 5:
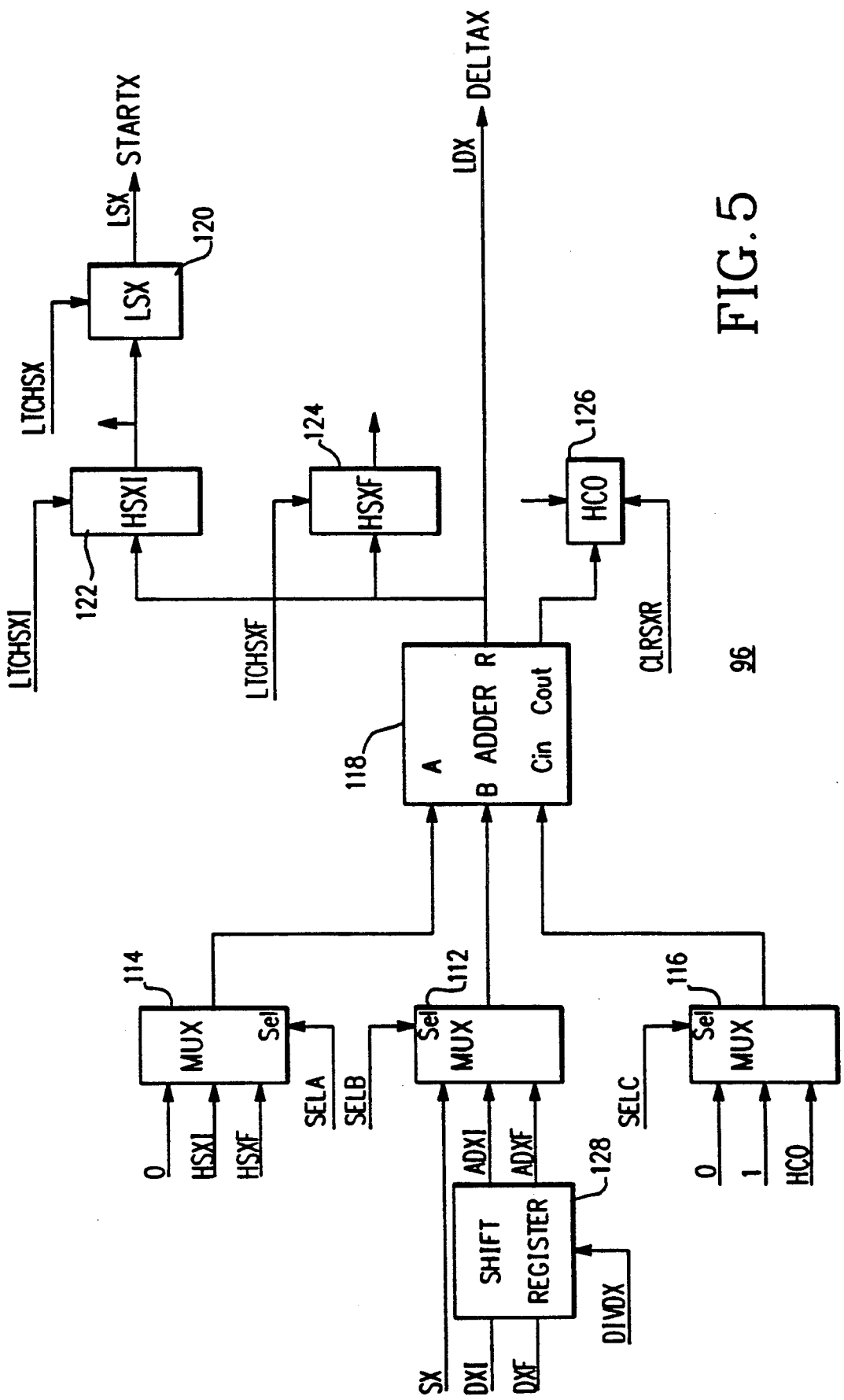
FIG. 5 is a block diagram of a digital integrator in the pixel processor of the preferred embodiment of the present invention.

Details of pixel address calculation will be provided with reference to FIG. 5. In the preferred embodiment, each primitive code includes the fields listed in the appendix. These codes are passed to the second stage working registers 88 and some of the fields are used in the second and third stages 80, 82 to calculate the storage location of each pixel code. The symbol code field is used to address the symbol font random access memory 100. The Start-Y and Delta-Y fields are supplied to the second stage circuitry 98 to provide a starting value for a counter and a value used to determine when to end the operation, respectively. The values in the Start-X, Delta-X-Integer and Delta-X-Fractional fields are supplied to the digital integrator 96 on lines SX, DXI and DXF, respectively. The second stage sequencer and controller 94 supplies the DIVDX, SELA, SELB, SELC, LTCHSXI, LTCHSX, LTCHSXF and CLRSXF to control the operation of the digital integrator 96.

For a symbol, the values STARTX and DELTAX do not change, since symbols are rectangular. Any portion of the 16×16 pixel array may be used by a pixel pattern for a symbol and the beginning and ending columns for all rows are defined by the values STARTX and DELTAX. Therefore, the control signals are generated so that in two cycles the value on line SX is output as STARTX, while the value on line DXI is output as DELTAX. This is accomplished by controlling multiplexer 112 to select a value on the SX line for addition to zeros selected by multiplexers 114, 116 by adder 118. The result is stored in the LSX, HSXI and HSXF registers 120, 122, 124. Then the value on the DXI line is selected by multiplexer 112, added by adder 118 to zeros selected by multiplexers 114, 116 and output as DELTAX.

Unlike a symbol, the processing of vectors in the digital integrator 96 varies by line. If the vector is horizontal and requires only one row of the CRT, the setup logic 86 calculates the STARTX and DELTAX values which are provided on the SX and DXI lines, respectively, and these values are directly output. In the more usual case, the value in the Delta-X field is used to calculate the slope of the vector as described in the appendix. The integer portion of the slope is provided on the DXI line and the fractional portion of the slope is provided on the DXF line. Using these values, the following steps are followed to generate the values STARTX and DELTAX for a vector.

The first and last rows of a vector are processed in a similar manner. The value on the SX line is first stored in the HSXI register 122 and the HSXF register 124 is reset to zero. In the next cycle, the value in the HSXI register 122 is stored in the LSX register 120 for eventual output as STARTX, the value on the ADXF line is added to the value in the HSXF register 124 and zero selected by multiplexer 116. Any carry produced by addition involving the HSXF register is stored in the HCO register 126, although for the first row there will be no carry since the value in the HSXF register 124 is zero. The value on the ADXF line is obtained by shifting the value on the DXF line one bit to the right in shift register 128, to divide by two. During processing of the first row only, the value in the HSXI register 122 is selected by multiplexer 114, added to the value on the ADXI line (one-half of the value on the DXI line) and to the carry, if any, stored in the HCO register 126. The result is stored in the HSXI register 122 for calculations in the next row (this step is skipped in processing of the last row since there is no following row). To end processing for the row, the value on the ADXI line (one-half of the value on the DXI line) is added to zeros from multiplexers 114, 116 and output as DELTAX.

To calculate the STARTX and DELTAX values to be output on the LSX and LDX lines, respectively, for all rows except the first and last rows, of a vector, the value stored in the HSXI register 122 during processing of the previous row is stored in the LSX register 120. Then the value in the HSXF register 124 is added to the value on the DXF line and zero selected by multiplexer 116. The result is stored in the HSXF register 124 with any carry stored in the HCO register 126. Next, the value in the HSXI register 122 is added to the value on the DXI line and the carry, if any, generated in the previous cycle, to store a new value in the HSXI register. To end processing of the row, the value on the DXI line is added to the value in the HCO register 126 and zero selected by multiplexer 114. The result is output as DELTAX.

Returning again to FIG. 4, the STARTX and DELTAX values on the LSX and LDX lines are supplied to the third stage working registers 106 together with the row address from the second stage circuitry 98 and the unused fields of the primitive code stored in the second stage working registers 88. The third stage circuitry 108 produces column addresses starting with the value STARTX. The column address is incremented the number of times indicated by the DELTAX value on the LDX line and a pixel code, including the display priority, is output to pixel control cells 130 in the fourth stage 84 for each generation of a new pixel address.

The pixel control cells 130 store the pixel code in one of the image memories 132 at the pixel address output by address generator 110 under the control of memory controller/sequencer 70. The bank bit in the pixel control data determines which of the image memories 132 will be used. Details of how the pixel control cells 130 compare the display and stored priorities to determine whether to modify the contents of the storage location at the pixel address will be described below with reference to FIG. 6.

As illustrated in FIG. 4, the output of the image memories 132 is supplied to a multiplexer 134 which selects one of the image memories 132 for display, while the other image memory 132 is being updated by the pixel control cells 130. In the preferred embodiment, the multiplexer 134 outputs 8 pixels at a time to the video mixer/driver 30.

Figure 6:
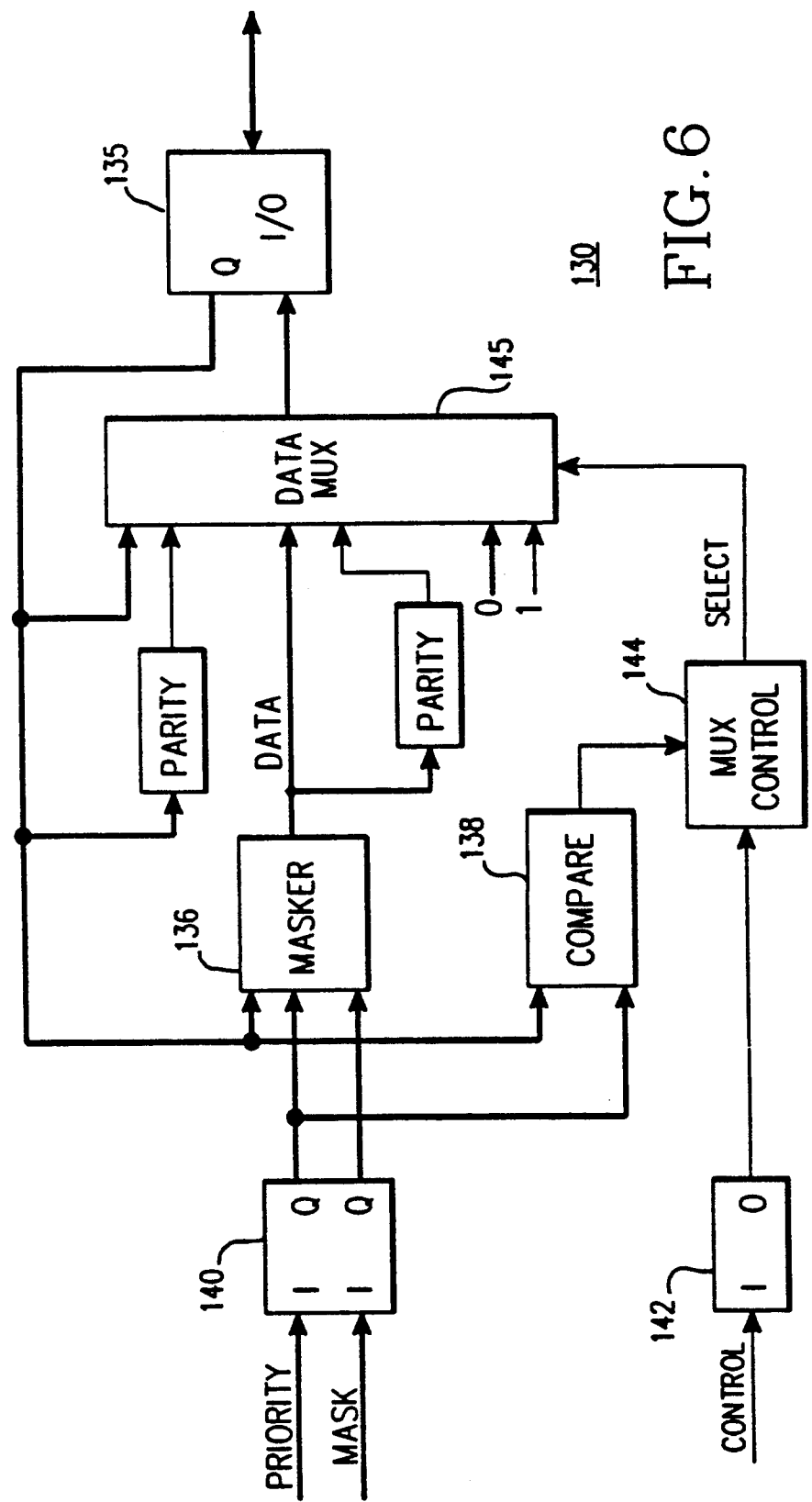
FIG. 6 is a block diagram of a pixel control cell in the pixel processor of the preferred embodiment of the present invention.

With reference to FIG. 6, a memory interface 135 obtains the stored pixel code at the storage location addressed by the pixel address output from address generator 110. The stored pixel code is supplied to a masker 136 and a comparator 138. The display priority and the value in the Mask field are supplied to a register 140 which supplies these values to the masker 136 and comparator 138. As indicated in the appendix, the value of the Mask field permits selective updating of the bits in the image memories 132. During normal operations, the mask will be all ones (FF hex), so that all the bits of the image memories 132 can be modified.

The comparator 138 compares the display and stored priorities to determine which should be stored in the image memories 132. The force priority bit is supplied to register 142 and if either the force priority bit or the output of the comparator 138 indicates that the pixel code should be written to the image memory 132, multiplexer control unit 144 controls multiplexer 145 to select the DATA line. Otherwise, the stored pixel code is selected and output to the image memory 132 addressed by the address generator 110, in dependence upon the bank bit.

The memory controller/sequencer 70 uses the control information from the primitive code to modify the memory cycle so that operations are performed as quickly as possible. When a temporary high-level graphics item like a cursor or the sweep of a radar antenna is moved around the screen, a copy mode instruction is first output by the display list interpreter 26 to the pixel processor 28 to copy the current contents which will be obliterated by the temporary high-level graphics item to an unused portion of one of the image memories 132. In the preferred embodiment, each image memory 132 is 1024×2048 bytes with each byte equal to 8 bits for storing the priority, plus extra parity bits. Standard monitors used in radar applications are 1024×1280 pixels, leaving 786,462 (1024×768) bytes unused, i.e., in a non-displayed area. This non-displayed area is preferably used to hold the "obliterated" pixel codes while the temporary high-level graphics item is displayed in their storage locations. When the temporary high-level graphics item is moved, the original data is copied back. These copy functions can be performed using a shorter memory cycle than the standard memory cycle used in the read-modify-write operation described above with respect to FIG. 6 and much faster than performing these operations by the display list interpreter 26.

An even shorter memory cycle can be used when the memory controller/sequencer 70 recognizes that a pixel code is to be repeated on a row. Video random access memories, such as Texas Instruments TMS44C250 have a page mode of operation in which the row address remains the same and only the column address changes. This allows the same pixel code (priority) to be written in consecutive columns of a single row very quickly.

Figure 7:
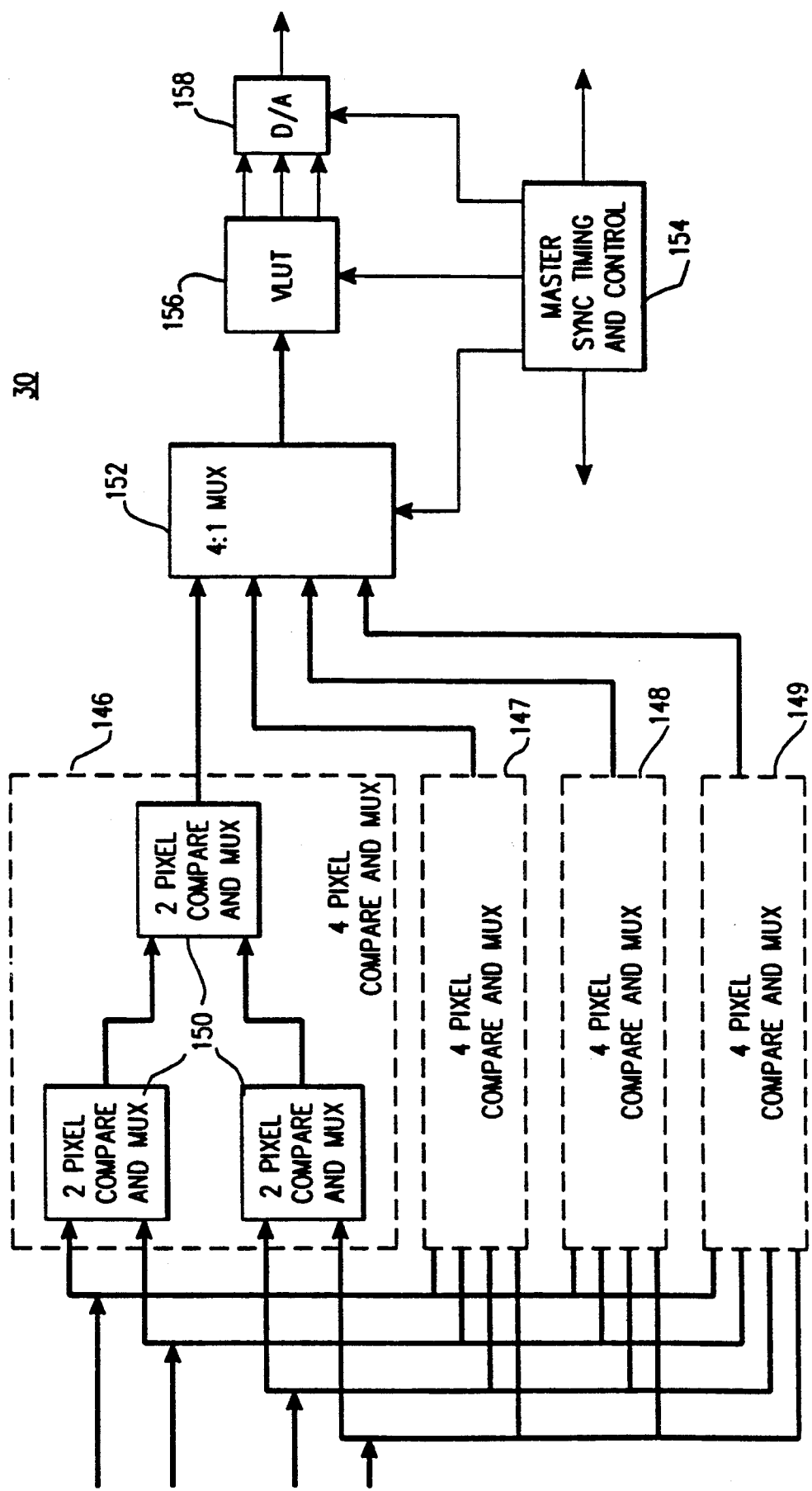
FIG. 7 is a block diagram of a video mixer/driver in the preferred embodiment of the present invention.

As illustrated in FIGS. 7 and 8B, the video mixer/driver 30 preferably can receive pixel codes from four different video sources. Selectors 146-149 each receive two of the pixels from each of the video sources. Three units 150 comparing and multiplexing two pixels each are provided in each of the selectors 146-149, as representatively illustrated in selector 146. The two pixel compare and multiplex units 150 compare four pairs of pixels in two steps to output the pair of pixels with the highest priority. A 4:1 multiplexer 142 selects the output from selectors 146-149 in sequence under the control of a master sync timing and control unit 154. One pixel at a time is output by the multiplexer 152 to a video look-up table 156 which converts the pixel code to a color. The color signals can then be output to a display device (not shown) as digital data or after conversion to an analog signal by a digital/analog converter 158.

As long as all of the video sources use the same convention for coding their pixel data, the mixer/driver 30 will merge the data onto a single screen. This permits radar data to be scan-converted by a separate processor and supplied to the video mixer/driver 30 for overlay on or to provide the background for a radar screen having textual information, airplane symbols, velocity vectors, etc. Since the display list interpreter functions are so processor intensive, it is possible for two display lists interpreters 26 to be connected to a single pixel processor 28. As a result, a graphics engine according to the present invention can be as simple as that illustrated in FIG. 8A in which a single display list interpreter 26, pixel processor 28 and video mixer/driver 30 are used, or as many as eight display list interpreters 26, used to process data from a variety of sources, can be combined on a single display device, as illustrated in FIG. 8B.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, accordingly, suitable modifications and equivalents may be resorted to, as falling within the scope and spirit of the invention.

APPENDIX

Primitive Code Fields

Priority (8 bits)
This is the pixel code written into the screen memory for a symbol or vector. During a symbol font load cycle, this field doubles as the 8 least significant bits of the 16 bits of a line of a pixel pattern to be stored in the symbol font RAM.

Bit Mask (8 bits)
During all read-modify-write graphics cycles (normal and copy mode), this field is strobed into the video RAMs to allow selective updating of the 8 bit-planes in the image memory by using the bit mask function inherent in the VRAMs. To allow all bit-planes to be modified during graphics cycles, this field should be set to FF (hexadecimal). During a symbol font load cycle, this field doubles as the 8 most significant bits of the 16 bits of a line of a pixel pattern to be stored in the symbol font RAM.

Symbol Code (11 bits)
Each symbol code defines a 16×16 pixel grid of a symbol graphics item. The actual width and height of the symbol are defined by Delta-X-Integer, and Delta-Y fields. A total of 2048 16×16 pixel symbols are available. Double high symbols (32 16 pixels) may be located on even symbol code boundaries, using the following odd symbol code as well. A double-high symbol may be generated by defining a Delta-Y of greater than 16. During a symbol font load cycle this field is set to the symbol code of the pixel pattern to be loaded.

Start-X (11 bits)
The starting X-position of a vector or symbol (upper left corner). Valid values are 0 to 2047, but only 0 to 1279 are visible.

Start-Y (10 bits)
The starting Y-position of a vector or symbol (upper left corner). Valid values are 0 to 1023, all are visible.

Delta-X-Integer (12 bits)

If the graphics item to be drawn is a symbol, this field defines the symbol width (in pixels) to be used. If the graphics item is a vector, this field contains the integer portion of the slope or DXIF (Delta-X-Integer-Fractional) field. DXIF is calculated from vector end points as follows:

DX=X2−X1
DY=Y2−Y1 (Delta-Y described below)
IF DY=0 THEN DY=1
DXIF=DX/DY

Delta-X Fractional (11 bits)

If the graphics item is a vector, this field contains the fractional portion of the DXIF field (slope), as calculated above.

Delta-Y (11 bits)

If the graphics to be drawn is a symbol, this field defines the height (in pixels) to be used. If the graphics item is a vector, this field contains the DY field used in calculating DXIF above. During a symbol font load cycle, the 4 least significant bits of this field double as the line number (0-15) of the line of the pixel pattern to be loaded into a 16×16 pixel symbol cell CAS Offset (9 bits)

This field is used only during copy mode cycles to generate the column address of the screen location to which the original pre-obliteration pixels are to be copied. The actual copy cycle column address (for the unmodified pixel write cycle) is generated by adding this offset to the normal graphics column address during each memory cycle. Wrap-around of the resulting 9-bit value (output from a 9-bit adder) is permitted.

RAS Offset (9 bits)

This field is used only during copy mode cycles, in a similar manner to the column address offset (CAS), but in generating the copy cycle row address. The copy mode cycles performed by the graphics memory controller may be performed much faster if this offset is zero (allowing page mode memory cycles).

X-Min Window (11 bits)

The window values specify the screen coordinates of the system window limits. Any graphics item with its Clip-Enable bit set will only be drawn (stored in the image memory) if its starting position is within the window limits. While an item is being drawn the limits will be checked. If the item crosses a window limit, generation of the item will stop. The X-Min Window field specifies the minimum X value (column address) of the system window in screen coordinates. Valid values are 0-1279.

X-Max Window (11 bits)

This field specifies the maximum X value (column address) of the system window in screen coordinates. Valid values are 0-1279.

Y-Min Window (10 bits)

This field specifies the maximum Y value (row address) of the system window in screen coordinates. Valid values are 0-1023.

Control (12 bits) broken into the following subfields:
Item (3 bits)
Species what graphics item type to draw.
0—IDLE: Draw nothing
1—VECTOR
2—BLOCK FILL: The square area defined by the Start-X, Start-Y and Delta-X-Int, Delta-Y fields should be completely filled with pixels rather than drawing a vector from one corner to the other. This function is primarily intended to be used during copy cycles to copy, move, or erase rectangular areas of the screen.
3—TRIANGLE FILL: Similar to Block Fill, except a right-triangle is defined by the four fields. Start-X and Start-Y define a point on the 'base' of the triangle.
4—SYMBOL
5—SYMBOL FONT CYCLE: When this bit is set, the normal graphics generation is disabled. Instead, the initiation of a graphics item start command will write a single 16 bit line, representing pixels in a symbol, into the symbol font RAM. Prior to issuing this load command, the following fields should be loaded:

Priority: Load with the 8 least significant bits of the 16 bit line of a pixel pattern for a symbol.
Bitmask: Load with the 8 most significant bits of the 16 bit line of a pixel pattern for a symbol.
4 least significant bits of Delta-Y: Load with the line number 0-15) of the 16 bit line of a pixel pattern for a symbol to be loaded into the 16×16 pixel symbol cell.
Symbol Code: Load with the symbol code of the 16 bit line of a pixel pattern for a symbol to be loaded into the 16×16 pixel symbol cell.

6—UNUSED
7—UNUSED
Clip-Enable (1 bit)

When set, this bit causes the defined graphics item to only be drawn, if the starting X, Y position of the item is within the system window defined by the Max/Min-X/Y fields. This will also cause generation of the item to stop when it crosses any of the window limits.

Type (2 bits)

This field defines the graphics mode cycle type to be used for the item:
0—Normal Symbol/Vector
1—Copy Mode Symbol/Vector
2—VRAM Memory to Shift Register
3—VRAM Shift Register to Memory Bank (1 bit)

Memory bank in which to perform graphics commands, i.e., image memory number 0 or 1.

Refresh Bank (1 bit)

Memory bank (image memory number) to display.

Attribute (2 bits)

Symbol/Vector attribute field:

| ATTR | SYMBOL | VECTOR |
| --- | --- | --- |
| 0 | Normal | Normal |
| 1 | Clear* | Dotted |
| 2 | Inverse Video | Dashed |
| 3 | Inv-Video w/ Clear* | Dot-Dash |

*-If the clear function is enabled for a symbol, all 'zero' bits within the defined height and width of the symbol will be written with a priority of 0 - regardless of the Force Priority bit.

Force Priority (1 bit)
0—Priority Mode—only pixels with higher priority (8-bit pixel value) than the current pixel on the screen (in the image memory) are written.
1—Force Write mode—all pixels defined by a symbol or vector are written into the image memory, regardless of the value already there.

Arbitrate Enable (1 bit)

This bit is used by a display list interpreter (DLI) function to indicate to the pixel processor that it is OK to give the FIFO-Graphics channel to another DLI function. After sending a command with this bit set, the DLI shall assume all fields are no longer valid.

What is claimed is:

1. A system for displaying graphics on a display device, comprising:
   a display list interpreter to receive high-level codes representing high-level graphics and to translate the high-level codes into primitive codes representing primitive graphics;
   a pixel processor, operatively connected to said display list interpreter and including a video memory, where said pixel processor:
   (i) determines pixel characteristics of all pixels, defined by each of the primitive graphics, by processing the primitive codes sequentially to produce a pixel address, pixel control data and pixel codes defining pixel appearance and display priority for each of the pixels defined by each of the primitive codes,
   stores the pixel codes in the video memory for output to the display device, and
   updates the video memory when the display priority of the pixel codes is higher than the display priority of previously stored pixel codes with the same pixel address; and
   a video a video mixer/driver, operatively connected to said pixel processor, to mix each stored pixel code from said pixel processor with any video signals from at least one additional video source.

2. A system as recited in claim 1, wherein an external bus provides the high-level codes to said display list interpreter, and
   wherein said display list interpreter comprises:
   a microprocessor;
   a microprocessor bus connected to said microprocessor;
   an instruction memory, operatively connected to said microprocessor, to store instructions controlling translation of the high-level codes into the primitive codes;
   an external bus interface connected to said microprocessor bus and to receive the high-level codes from the external bus;
   a graphics bus interface operatively connected to said microprocessor bus and said pixel processor, to supply the primitive codes to said pixel processor; and
   a display list memory, operatively connected to said microprocessor bus, to store the high-level codes for processing by said microprocessor.

3. A system as recited in claim 2,
   wherein said display list interpreter further comprises:
   an address controller, operatively connected to said microprocessor bus, said instruction memory, said external bus and said display list memory, to supply addresses to said display list memory in dependence upon addresses received from said microprocessor bus and said external bus; and
   a data controller, operatively connected to said microprocessor bus, said external bus and said display list memory, to control data transmission between said external and microprocessor buses and said display list memory, and
   wherein said display list memory is a dual port random access memory having an address port operatively connected to said address controller, a first data port operatively connected to said data controller and a second data port operatively connected to said microprocessor bus and having an internal buffer for storing data to be transmitted to said microprocessor bus via the second data port under control of said data controller, while receiving data from said external bus via the first data port.

4. A system as recited in claim 1, wherein said pixel processor has a pipelined architecture and comprises:
   a first stage, having holding registers operatively connected to said display list interpreter, to receive and store the primitive codes in the holding registers;
   a second stage, having second stage working registers operatively connected to the holding registers in said first stage, to receive the primitive codes from said first stage when processing of previous primitive codes is complete, to release the holding registers for receipt of subsequent primitive codes and to determine lines of the display device used by the primitive graphics represented by the primitive codes;
   a third stage, having third stage working registers operatively connected to said second stage, to determine the pixel address of each of the pixels defined by each of the primitive codes; and
   a fourth stage, operatively connected to said third stage, to compare the display and stored priorities and to store the pixel codes having higher priority.

5. A system as recited in claim 4, wherein said second stage comprises:
   a symbol font random access memory to store relative pixel positions of pixels within symbols included in the primitive graphics; and
   line means for determining lines used by the symbols stored in said symbol font random access memory.

6. A system as recited in claim 5, wherein said line means comprises:
   a second stage controller, operatively connected to said first and third stages, for controlling sequence of data flow and operation of said second stage; and
   a digital integrator, operatively connected to said second stage controller, the second stage working registers, said symbol font random access memory and the third stage working registers, to determine a row address and a starting column address for up to a predetermined number of pixels.

7. A system as recited in claim 6, wherein each primitive code includes fields indicating a starting position in each of column and row and an extent in each of column and row, and
   wherein said digital integrator comprises:
   means for selecting between integer and fractional values of the starting position and the extent to produce selected values; and
   adding means for adding the selected values to produce position information in both column and row.

8. A system as recited in claim 4, wherein said fourth stage comprises:
   at least two image memories, operatively connected to said video mixer/driver, to store the pixel codes, one of said image memories at a time providing output to said video mixer/driver;
   pixel control cells, operatively connected to said third stage and said image memories, to compare the display and stored priorities and to output the pixel code having higher priority to at least one of said image memories; and a memory controller, operatively connected to said third stage, said image memories and said pixel control cells, to select one of said image memories to provide output to said video mixer/driver and to select another of said image memories to receive the pixel codes from said pixel control cells.

9. A system as recited in claim 8, wherein each of said pixel control cells comprises:

a memory interface, operatively connected to said image memories, to receive a stored pixel code from and to output a higher priority pixel code to one of said image memories;

a comparator, operatively connected to said third stage and said memory interface, to compare the display priority of a new pixel code received from said third stage with the stored priority of the stored pixel code received from said memory interface to produce a control signal indicating one of the new pixel code and the stored pixel code as the higher priority pixel code; and a multiplexer, operatively connected to said third stage, said memory interface and said comparator, to select the higher priority pixel code from among the new pixel code and the stored pixel code in dependence upon the control signal from said comparator.

10. A system as recited in claim 1, wherein said pixel processor controls reading and writing in the video memory using a read-modify-write cycle of reading the stored pixel code and writing one of the stored pixel code and a new pixel code produced by said pixel processor, in dependence upon the display and stored priorities.

11. A system as recited in claim 10, wherein said video mixer/driver is connectable to up to a first predetermined number of video sources, including said pixel processor, and each of the video sources supplies up to a second predetermined number of the pixel codes in a group transmitted at substantially a single instant in time, and said video mixer/driver comprises:

a plurality of selectors, each connected to all of the video sources to compare and select a third predetermined number, smaller than the second predetermined number, of the pixel codes from one of the video sources in dependence upon the display priority of the pixel codes;

a multiplexer, operatively connected to said selectors, to output the pixel codes from one of said selectors at a time;

a video look-up table, operatively connected to said multiplexer and the display device, to produce video codes for the display device from the pixel codes output by said multiplexer; and a controller, operatively connected to said multiplexer, said video look-up table and said pixel processor to control synchronization of data transmission between said pixel processor, said video mixer/driver and the display device.

12. A graphics engine for converting high-level graphics into pixel data defining pixels on a display device, characterized by:

definition means for defining methods for converting the high-level graphics into primitive graphics;

interpreter means for translating the high-level graphics into the primitive graphics using the methods defined by said definition means;

pixel code means for converting each of the primitive graphics into at least one pixel code, each pixel code including pixel characteristics and a display priority and having a storage location associated therewith;

pixel storage means for storing each of the pixel code at the storage location in said pixel storage means when the display priority in the pixel code is higher than a stored priority at the storage location; and output means for outputting the pixel characteristics in a portion of said pixel storage means to the display device;

wherein said pixel codes include a force priority bit and said pixel storage means further stores the pixel codes having the force priority bit set, regardless of the display and stored priorities.

13. A graphics engine as recited in claim 12, wherein said interpreter means includes means for storing only the primitive graphics transmitted from each new item of the high-level graphics, and wherein said pixel code means sends to said pixel storage means only the pixel codes converted from the primitive graphics transmitted from each new item of the high-level graphics.

14. A graphics engine as recited in claim 12, wherein said pixel storage means comprises:

memory means for storing the pixel codes;

interface means for reading and writing the pixel codes from and to said memory means; and comparison means for comparing the display and stored priorities to select between a new pixel code output from said pixel code means and a stored pixel code read from the storage location, for storing in said memory means via said interface means.

15. A graphics engine as recited in claim 14, wherein said memory means is a video random access memory which copies between areas at a faster speed than an initial write of the pixel code; and wherein said pixel storage means further comprises memory controller means for controlling memory cycles to provide faster memory cycles when copying within areas of said video random access memory.

16. A graphics engine as recited in claim 15, wherein said pixel code means comprises address control means for supplying a temporary storage location in a non-display area of said video random access memory and the storage location in a display area of said video random access memory, when the pixel code corresponding to a temporary high-level graphics item is to be stored in the storage location in the display area, and wherein said memory controller means adds special timing to a standard memory cycle to copy the pixel code read from the storage location in the display area to the temporary storage location, when the pixel code corresponds to the temporary high-level graphics item, and subsequently returns the pixel code from the temporary storage location to the storage location in the display area, when the temporary high-level graphics item is removed.

17. A graphics engine as recited in claim 15, wherein said video random access memory has rows and columns which operate in a page mode, and wherein said memory controller means provides a page mode memory cycle, shorter than a standard memory cycle, when a preceding pixel code stored in a first column on one of the rows of said video random access memory is immediately followed by a subsequent pixel code to be stored at a second column on the one of the rows of said video random access memory.

18. A method of converting high-level graphics into pixel data defining pixels on a display device, comprising the steps of:
   (a) converting each of the primitive graphics into at least one pixel code, each pixel code including pixel characteristics and a display priority and having a storage location associated therewith;
   (b) storing methods defining translation from the high-level graphics to primitive graphics prior to the converting in step (a);
   (c) translating the high-level graphics into the primitive graphics using the methods stored in step (b) prior to the converting in step (a); and
   (d) storing each of the pixel codes at the storage location when the display priority in the pixel code is higher than a stored priority at the storage location; wherein the storing in step (d) further comprises the steps of:
      (d1) reading a stored pixel code having the stored priority from the storage location associated with a new pixel code;
      (d2) comparing the display priority in the new pixel code with the stored priority;
      (d3) selecting between the new and stored pixel codes in dependence upon the display and stored priorities to produce a selected pixel code;
      (d4) storing the selected pixel code at the storage location; and
      (d5) varying memory cycles determining time between storage of consecutive pixel codes in dependence upon where the selected pixel code is written and where an immediately previous pixel code was written.

19. A method as recited in claim 18,
   wherein the pixel codes are written in an image memory having rows and columns, and
   wherein said varying in step (d5) produces a shorter memory cycle when the row receiving the selected pixel code and the row receiving the immediately previous pixel code are identical.

20. A method as recited in claim 18,
   wherein said translating in step (b) includes translating high-level move commands into copying instructions from a first set of storage locations to a second set of storage locations, and
   wherein said storing in step (d) further comprises the step of (d6) copying between the first and second steps of storage locations using shorter memory cycles than used for steps (d1)–(d4).

* * * * *